US009965560B2

(12) United States Patent
Sun et al.

(10) Patent No.: US 9,965,560 B2
(45) Date of Patent: May 8, 2018

(54) SOCIAL-DISTANCE PERMISSION-BASED SEARCH ALGORITHM

(71) Applicant: Samsung Electronics Co., Ltd., Suwon-si, Gyeonggi-do (KR)

(72) Inventors: Xiang Sun, San Jose, CA (US); Luyi Wang, Santa Clara, CA (US); Peter King, San Mateo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 14/611,772

(22) Filed: Feb. 2, 2015

(65) Prior Publication Data
US 2016/0224640 A1 Aug. 4, 2016

(51) Int. Cl.
G06F 17/30 (2006.01)
G06Q 50/00 (2012.01)

(52) U.S. Cl.
CPC ....... *G06F 17/30867* (2013.01); *G06Q 50/01* (2013.01)

(58) Field of Classification Search
CPC ......... G06F 17/30867; G06F 17/30554; G06F 17/3053; G06F 17/30; G06Q 50/01
See application file for complete search history.

(56) References Cited

U.S. PATENT DOCUMENTS 7,818,394 B1 10/2010 Lawler et al.
7,856,449 B1* 12/2010 Martino ............. G06F 17/3089
707/781
7,979,411 B2* 7/2011 Mattox, Jr. ............ G06Q 10/10
705/319
8,892,591 B1 11/2014 Haugen et al.
8,935,245 B1 1/2015 Cionca et al.
9,258,264 B1* 2/2016 Shoham ................. H04L 51/32
707/E17.014
9,763,069 B2* 9/2017 Hong .................... H04W 4/206
455/456.3
2007/0038515 A1* 2/2007 Postrel .................. G06Q 20/06
705/14.3
2007/0271232 A1* 11/2007 Mattox .................. G06Q 10/10
705/319
2008/0183694 A1 7/2008 Cane et al.
2009/0307018 A1* 12/2009 Chappell ........... G06F 17/30867
705/5
2010/0174712 A1* 7/2010 Li ..................... G06F 17/30699
707/736
2011/0087842 A1* 4/2011 Lu ..................... G06F 17/30867
711/126

(Continued)

FOREIGN PATENT DOCUMENTS

EP 2077522 A1 7/2009
EP 1964022 B1 3/2010
(Continued)

*Primary Examiner* — Anh Ly
(74) *Attorney, Agent, or Firm* — Jefferson IP Law, LLP

(57) ABSTRACT

An apparatus, system and method for providing search results based on a social distance from a user are provided. The method includes receiving a search query from a user, setting a value representing a social distance from the user, the social distance including one or more levels, gathering results corresponding to the search query for each level of social distance, and providing the gathered results to the user.

13 Claims, 4 Drawing Sheets

(56) References Cited

U.S. PATENT DOCUMENTS

| | | | |
|---|---|---|---|
| 2012/0151383 A1* | 6/2012 | Kazan | G06Q 10/101 715/753 |
| 2012/0185472 A1 | 7/2012 | Ahmed et al. | |
| 2012/0246087 A1 | 9/2012 | Talati et al. | |
| 2012/0290660 A1 | 11/2012 | Rao et al. | |
| 2012/0310926 A1 | 12/2012 | Gannu et al. | |
| 2012/0311032 A1* | 12/2012 | Murphy | G07F 17/3225 709/204 |
| 2013/0024447 A1 | 1/2013 | Leng | |
| 2013/0036112 A1* | 2/2013 | Poon | G06Q 50/01 707/723 |
| 2013/0041876 A1* | 2/2013 | Dow | G06F 17/30867 707/706 |
| 2013/0086057 A1* | 4/2013 | Harrington | G06F 17/30864 707/732 |
| 2013/0191464 A1* | 7/2013 | Burckart | G06Q 50/01 709/206 |
| 2013/0254294 A1* | 9/2013 | Isaksson | G06Q 10/101 709/204 |
| 2013/0325847 A1* | 12/2013 | Suchter | G06F 17/30864 707/722 |
| 2014/0019447 A1* | 1/2014 | Goryavskiy | G06F 17/30867 707/732 |
| 2014/0330809 A1* | 11/2014 | Raina | G06F 17/2705 707/722 |
| 2014/0330818 A1* | 11/2014 | Raina | G06Q 30/02 707/723 |
| 2014/0330819 A1* | 11/2014 | Raina | G06F 17/3053 707/723 |
| 2015/0006637 A1* | 1/2015 | Kangas | H04L 67/10 709/204 |
| 2015/0100578 A1* | 4/2015 | Rosen | G06F 17/30598 707/737 |
| 2016/0034463 A1* | 2/2016 | Brewer | H04L 43/12 707/734 |
| 2016/0094943 A1* | 3/2016 | Cao | H04W 4/021 455/456.1 |
| 2016/0179965 A1* | 6/2016 | Bhatia | G06F 17/30867 707/749 |

FOREIGN PATENT DOCUMENTS

| | | |
|---|---|---|
| WO | 2007076210 A1 | 7/2007 |
| WO | 2013/056179 A1 | 4/2013 |
| WO | 2013056179 A1 | 4/2013 |

\* cited by examiner

SOCIAL-DISTANCE PERMISSION-BASED SEARCH ALGORITHM

BACKGROUND

With the advent of the Internet and corresponding advances in computer technologies, a user is able to gather information regarding nearly any topic or subject. For example, a user is able to use a personal computer or other electronic device to access the Internet by means of a web browser and search for desired information. This ability to search for and gather desired information has effectively become a necessity for most people as daily Internet searching is a common occurrence.

However, the results provided by a typical search engine in response to a user's search request are often so broad or general that the user must spend a lot of time analyzing the results before finding information that may be relevant or otherwise of use. Alternatively, the user may be forced to perform another search with a different search query that uses additional terms or different terms in order to narrow the results of the search. In either event, it is an inconvenience for the user in that desired or appropriate search results are not readily available from the initial search.

To provide search results that are better tailored for the user, some applications allow the user to narrow the field of search based on certain variables. For example, some applications allow a user to perform a search based on strong-tie associations with other users. That is, some applications allow a user to perform a search based on their list of contacts, or other associations of the user. However, there is currently no method for prioritizing search results based on data permissions or social weight in shared data containers.

The above information is presented as background information only to assist with an understanding of the present disclosure. No determination has been made, and no assertion is made, as to whether any of the above might be applicable as prior art with regard to the present invention.

SUMMARY

Aspects of the present invention are to address at least the above-mentioned problems and/or disadvantages and to provide at least the advantages described below. Accordingly, an aspect of the present invention is to provide an apparatus, a system and a method for providing improved search results.

Another aspect of the present invention is to provide an apparatus, system and method for providing search results that are more relevant to a user's search query.

Another aspect of the present invention is to provide an apparatus, system and method for providing fewer but more relevant search results in response to a user's query.

Another aspect of the present invention is to provide an apparatus, system and method for providing search results based on a social distance from a user.

In accordance with an aspect of the present invention, a method for searching for contents is provided. The method includes receiving a search query from a user, setting a value representing a social distance from the user, the social distance including one or more levels, gathering results corresponding to the search query for each level of social distance, and providing the gathered results to the user.

In accordance with another aspect of the present invention, a system for searching for contents is provided. The system includes a content source, and a connector configured to receive a search query from a user, to set a value representing a social distance from the user, the social distance including one or more levels, to gather results corresponding to the search query for each level of social distance from the content source, and to provide the gathered results to the user.

In accordance with another aspect of the present invention, a user device for searching for contents is provided, the user device includes an input device configured to receive a search query from a user and to receive a value representing a social distance from the user, the social distance including one or more levels, a wireless communication device configured to transmit the search query and the value representing the social distance to a network and to receive results corresponding to the search query for each level of social distance, and a display device configured to provide the received results to the user.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
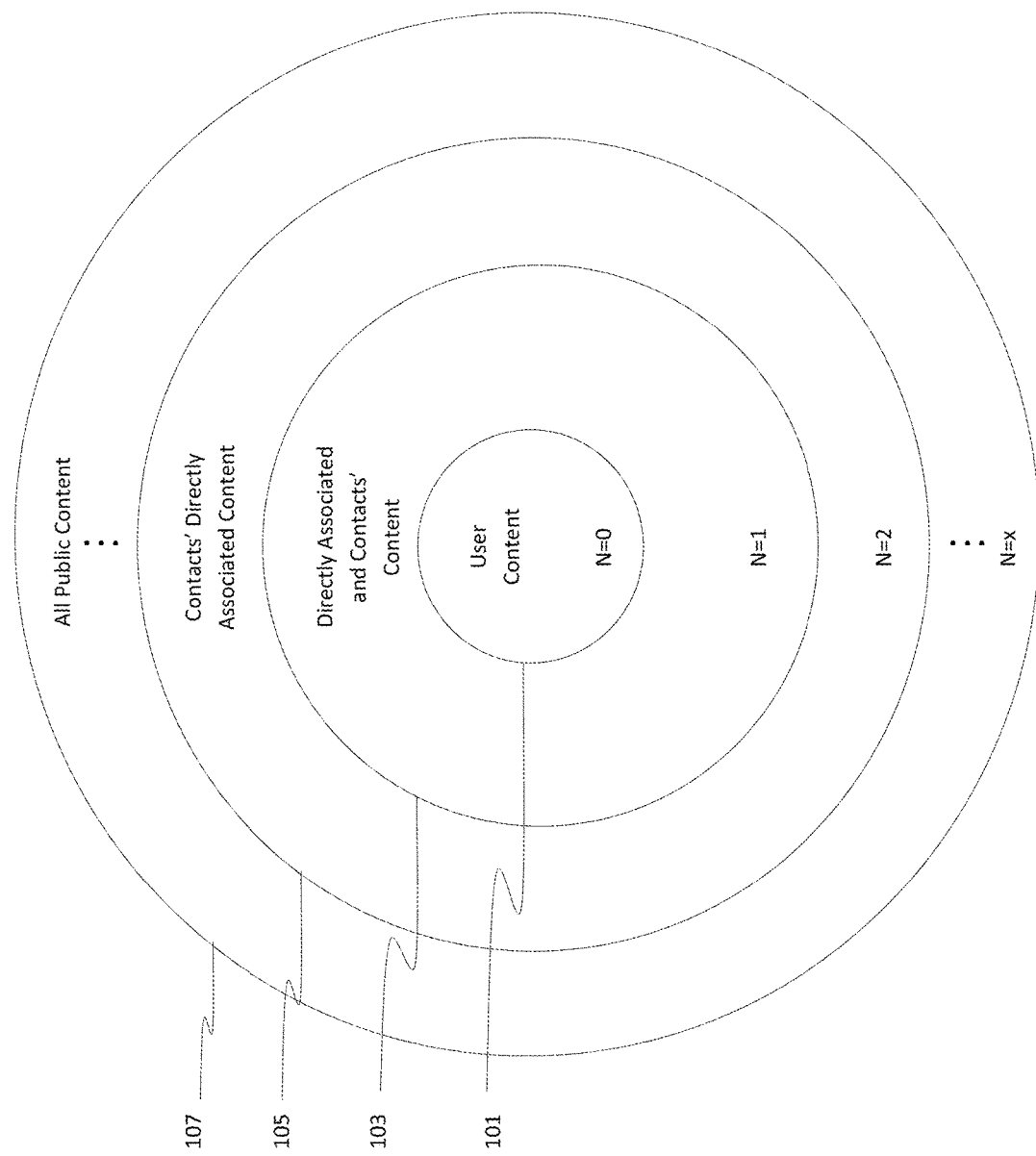
FIG. 1 illustrates a social distance of user content according to an embodiment of the present disclosure.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged portable electronic device. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

According to embodiments of the present disclosure, an apparatus, a method and a system for implementing a search algorithm for a content-container data graph are provided. More specifically, an algorithm is provided in which a search is performed based on a social distance.

As described above, a result of a search performed with an algorithm of the related art typically includes a vast amount of content that may be irrelevant to the user's needs. For example, using an algorithm of the related art, a user is able to search 'globally' for contents as when performing a typical internet search using a known search engine. However, the volume of results from such a search is typically so such that the user must spend time deciphering and narrowing the results in order to obtain information of use.

Also known in the related art are search algorithms based on a user's contacts. Here, a user's contact may include another user that is listed in the user's address book, such as by including a phone number, an email address, etc. of the other user, another user with whom the user has an established connection such as a friend on a Social Networking Service (SNS) website, and the like. When using such a search algorithm, as within an SNS website, the user is able to perform a search but within a narrowed field of content. That is, the user is able to narrow the field of searchable content to content that is associated with the user's contacts. For example, when searching on an SNS website, if the user selects to search within the contents associated with his or her contacts, and several contacts in the user's contact list have indicated an affinity for country music, the results of a user's search for popular songs may produce many hits of country songs. That is, as compared to a global search, a search based on a user's contact list will return a narrowed field of results that is assumed to be more tailored to the user given the assumed similarities of the user and his or her contacts.

However, the assumption of similarities between the user and his or her contacts may be unfounded. That is, a user is likely to have many disparate contacts, some or even most of which may not be considered as a contact with common interests. For example, a user's contact list may include members of the user's extended family, the user's professional or business contacts, the user's medical contacts, and the like. Moreover, the list of contacts may be outdated as most users do not typically review and purge their contact lists on a regular basis. Hence, while the results of a search based on the user's contact list may be narrowed as compared to a global search, the results may not be any more relevant than those received from a global search.

Aspects of the present disclosure address the above problems by providing an algorithm that searches for content based on a social distance and thus provides a more meaningful search result.

FIG. 1 illustrates a social distance of content according to an embodiment of the present disclosure.

Referring to FIG. 1, user content 101 includes content that is 'owned' by a user (e.g., a first user). In more detail, the first user may participate in an SNS or other type of application or service in which the first user is able to create a group and/or be a member of another group. For example, while executing the SNS application, the first user may create a group regarding mystery novels. As part of creating that group, the first user may populate the group to include various titles of mystery novels, authors of mystery novels, articles that relate to mystery novels, movies based on mystery novels, local events regarding mystery novels, and the like. Because the first user has created the group, the first user is considered the owner of the data in that group, and the group is denoted as a data container. That the first user is the owner of the mystery novel data container is reflected by the social distance N being equal to zero (i.e., N=0).

As part of the SNS application, other users (e.g., a second user) may join the mystery novel group, such as by invitation, request, or other means. Such second users may be considered as data container collaborators or data container followers. A data container collaborator has permission not only to read data from the first user's data container, but also to write data to the data container. On the other hand, a data container follower only has permission to read data from the first user's data container. Such permissions may be set by the first user (i.e., owner of the data container), by the SNS application, originally set by the SNS application and altered by the first user, or any such combination.

These second users, either collaborators or followers, may be owners of their own data containers. Furthermore, the first user may be a collaborator or follower of other data containers within the SNS application. This set of data containers that is directly associated with the first user, either by means of his or her direct involvement as a collaborator or follower, or through the ownership of the other data container by a collaborator or follower of the first user's data container, is considered to constitute content at a social distance of N=1 and is reflected as content 103.

As an example of content 103, a collaborator or follower (e.g., second user) of the first user's mystery novel data container may have originated a data container for antique cars. Furthermore, the first user may be a collaborator or follower of a second user's data container for fishing boats. Accordingly, the content 103 would include both the data container for antique cars and the data container for fishing boats. As another example of content 103, both the first user of the SNS application and a second user of the same SNS application may indicate that they like an item (e.g., by giving the item a 'thumb's up') such as a picture of a local sports team. In that regard, the first user and the second user now have a social distance of N=1 such that the second user's data container's may be included in the content 103.

It should be noted at this point that data containers established in the SNS application may be designated by the owners as public or private. As such, if a second user's data container is designated as a private container, the content of such a private container would not be accessible as part of the content 103. For example, if both the first user and a second user indicated that they like the same item as described above, only the second user's data containers that were designated as public, or, in other words, not designated as private, would be considered as part of the content 103.

Furthermore, in an embodiment of the present disclosure, the content 103 may include non-private content associated with the first user's contacts. That is, as part of the SNS application, the first user may establish contacts, such as friends, etc., that are not necessarily collaborators or followers of any of the first user's data containers and that do not have data containers to which the first user is a collaborator or follower. However, based on their social distance from the first user, the non-private data containers of such contacts would also be included in the content 103.

Content 105 represents data that is one more step removed from the first user insofar as a social distance, that is a social distance of N=2. For example, and further to the example above, the second user, who is a collaborator or follower of the first user's group for mystery novels, may establish his or her own group regarding antique cars. It may be assumed that still another user (e.g., a third user) is a collaborator or follower of the antique cars group and that the third user may have originated a group or data container regarding the sport of tennis. In that case, because the second user is at a social distance of N=2 such that the data container for the antique cars would constitute data in the content 103, the third user is at a social distance of N=3 such that the data container for the sport of tennis would be included in the content 105.

As the social distance increases (i.e., N continues to increment by 1), the amount of corresponding data also increases. Notably, at some point as N increases, the social distance is so great as to represent all non-private (e.g., public) content 107 of the SNS application.

An obvious advantage of performing a search using an algorithm based on social distance is that the result of such a search will provide contents from second users (third users, etc.) with whom the first user (i.e., the user performing the search) already shares a common interest. That is, if the first user and the second user already share an interest in mystery novels at a social distance of N=1, when the first user performs a search for recommended local restaurants, data containers in the content 103 (the content 105, etc.) that are associated with the second user (i.e., at social distance of N=1, 2, 3, etc.) may contain data that is much more relevant to the first user, and thus provide a more meaningful search result. Of course, as the social distance greatly increases (i.e., at N=x), the data content effectively mimics all public content such that the search results are not as effective. Accordingly, in an embodiment of the present disclosure, the value of N may be altered depending on the search results, at the discretion of the user performing the search, and the like.

On the other hand, if the first user grows tired of and closes the mystery novel data container and establishes a new data container for, e.g., tropical vacations, a new set of second users may become collaborators and followers of the tropical vacation data container such that a new set of data becomes part of the content 103, content 105, etc. In that case, if the first user again performs a search for recommended local restaurants, the search results would vary from the previous search for local restaurants, but still be more meaningful to the first user than a search of all public data as in the related art.

Figure 2:
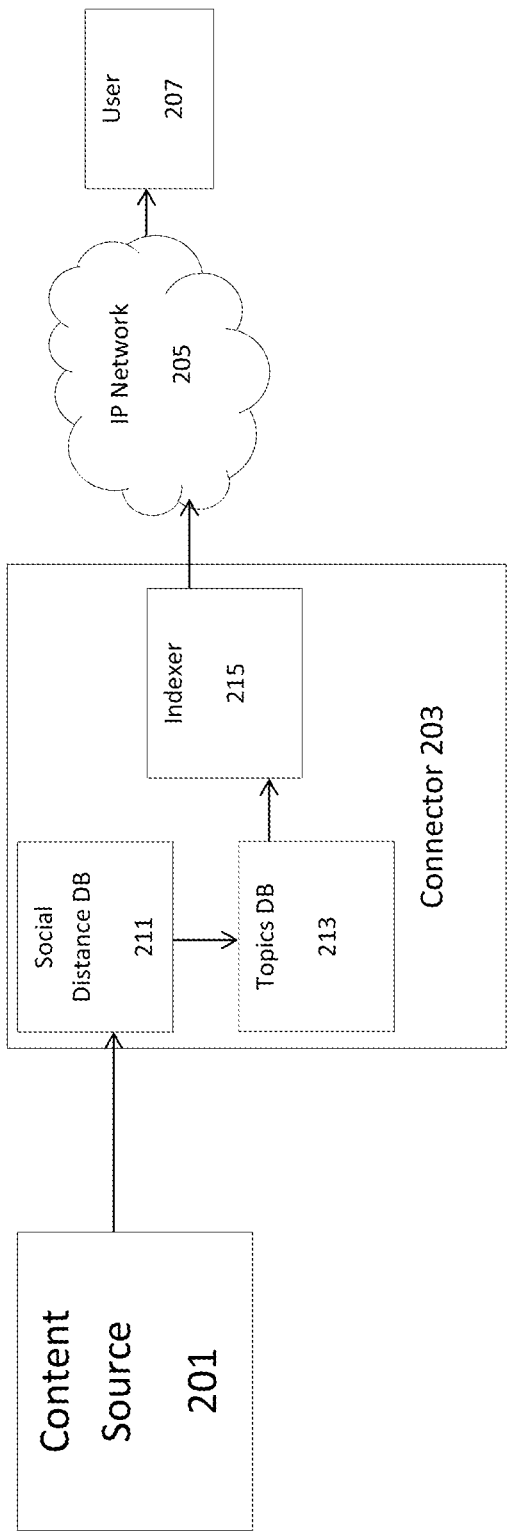
FIG. 2 illustrates a system for performing a search algorithm according to an embodiment of the present disclosure.

FIG. 2 illustrates a system for performing a search algorithm according to an embodiment of the present disclosure.

Referring to FIG. 2, the system includes a content source 201, a connector 203, an Internet Protocol (IP) Network 205, and a user 207.

The content source 201 may include data containers created as part of an SNS application. In more detail, users of an SNS application may have access to any variety of content, such as content found on the world wide web, content loaded by a user to the SNS application, and the like. Using the various content, a user of the SNS application may originate a data container so as to group content at the discretion of the user. As described above, a data container may relate to a specific topic, such as mystery novels, antique cars, fishing boats, the sport of tennis, and the like.

The connector 203 is provided as a connection between the content source 201 and the IP network 205. The connector 203 may include necessary components to execute an algorithm for searching based on social distances of a user 207. In this regard, the connector 203 may include a social distance database 211, a topics database 213, and an indexer 215. The connector 203 may of course contain more components which are not illustrated here for the sake of convenience. For example, although not shown, the connector 203 may include a search engine, an analysis engine, and the like.

According to an embodiment of the present disclosure, the social distance database 211 includes information regarding the user 207 which indicates a social distance with other users. For example, the social distance database 211 may include information that indicates the user 207 has a social distance of N=1 to other users with whom the user 207 shares a direct interest. As described above, a direct interest may be indicated when the user 207 and a second user are each associated (e.g., an owner, a collaborator, or a follower) with the same data container. Further, a direct interest may be indicated with the user 207 and a second user both indicate an interest in the same topic, such as by giving a thumbs up to an item, in the content source 201. The social distance database 211 may further indicate that the user 207 has a social distance of N=2 with third users that are associated with the second users, a social distance of N=3 with fourth users that are associated with the third users, and so on.

The topics database 213 may store words associated with particular topics identified within a personal vocabulary of the user 207. The indexer 215 may assist in categorizing the topics of the topics database 213.

The IP network 205 may provide an interface between the connector 203 and the user 207. That is, the IP network 205 represents a communication path that includes a series of points or nodes for receiving and transmitting packets of information to and from the connector 203 and the user 207.

The user 207 represents an end user having a connection to the content source 201 through the connector 203 and IP network 205. In an embodiment of the present disclosure, when the content source 201 is implemented as an SNS application, the user 207 may have an account with the SNS application or otherwise access the SNS application to establish various connections and thus social distances with other users of the SNS application. To access the IP network 205, the user 207 may use any of various devices such as a Personal Digital Assistant (PDA), a laptop computer, a mobile phone, a smart phone, a Netbook computer, a television, a Mobile Internet Device (MID), a Ultra Mobile Personal Computer (UMPC), a tablet Personal Computer (PC), a wrist watch, a camera device, a navigation device, a MPEG Layer 3 (MP3) player, and a wearable device.

Figure 3:
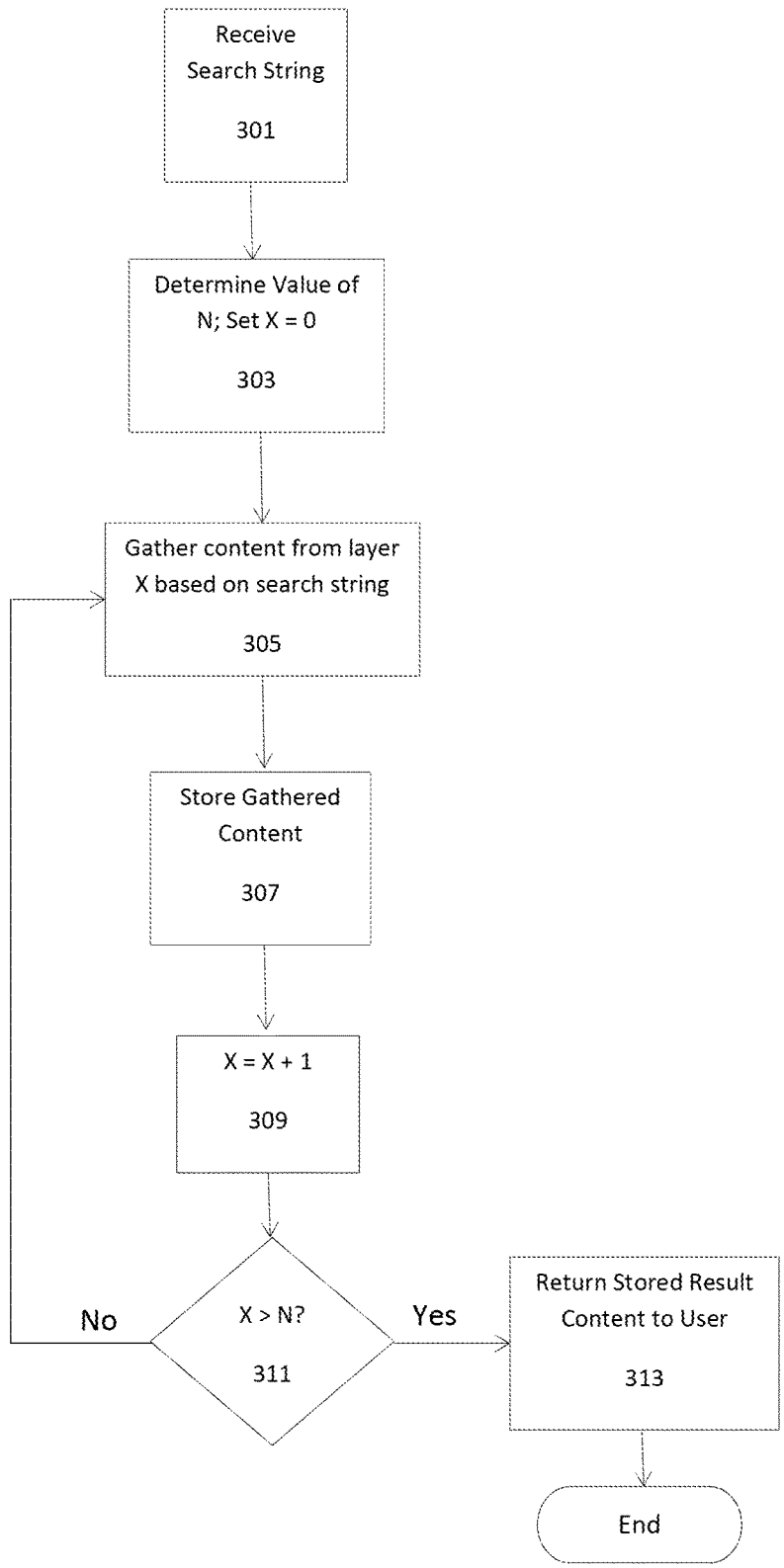
FIG. 3 illustrates a method of searching content according to an embodiment of the present disclosure.

FIG. 3 illustrates a method of searching content according to an embodiment of the present disclosure.

Referring to FIG. 3, a user inputs a search string in operation 301. In operation 303, a value of N is determined and a counter value X is set to zero. As discussed above, the value of N represents a social distance between the user and other users. In an embodiment, the value of N may be input by the user. In another embodiment, the value of N may be set by the search engine that performs the search for the user. In either scenario, the value of N may be changed depending on the size, relevance, etc. of the returned search result. For example, if a starting value of N is determined to be 6, the search results may be too extreme insofar as too great a size and/or too low a relevance. In that case, the value of N may be lowered such as to 5 or a lower value in order to reduce the size of the search result or to obtain more relevant information. Again, the value of N may be lowered manually or automatically by either the user or the search engine performing the search.

The counter value of X is initialized to zero as a means of iteratively performing the search in layers. That is, in the first iteration of operation 305, content is gathered from layer 0 based on the search string. In other words, and with reference to FIG. 1, the first iteration of gathering content is performed in the data containers at level N=0. Again, content at this level includes the user's private or public folders, including those owned by the user as well as those collaborated by the user and followed by the user, which are searched based on the search string.

In operation 307, the results gathered in operation 305 are stored for later return to the user. In operation 309, the counter X is incremented by 1 and in operation 311, it is determined if the value of X is greater than the value of N. That is, it is determined if each desired social distance level N has been searched by the search engine. If X is greater than N, this indicates that all desired social distance levels have been searched. In that case, the gathered search results from all N levels are returned to the user in operation 313.

On the other hand, if X is less than or equal to N, this indicates that all desired social distance levels have not been searched and the process returns to operation 305. In that case, the process continues searching at the next higher level of N. In the second iteration of operation 305, the level N=1 is searched. In that case, data containers, which are not designated as private and which are owned, collaborated or followed by a second user that is associated with the first user as described above, are searched.

In operation 305, the gathering and ultimate listing of content that matches the search string may be performed based on any of several criteria. For example, the matching content may be listed alphabetically, based on last access, based on most activity, based on time created, and the like. Furthermore, when N≥1, the matching content may be listed based on the number of data containers shared between the first user and the second user, the number messages exchanged between the first and second users, the time or date that the second user was added as a contact, and the like.

Figure 4:
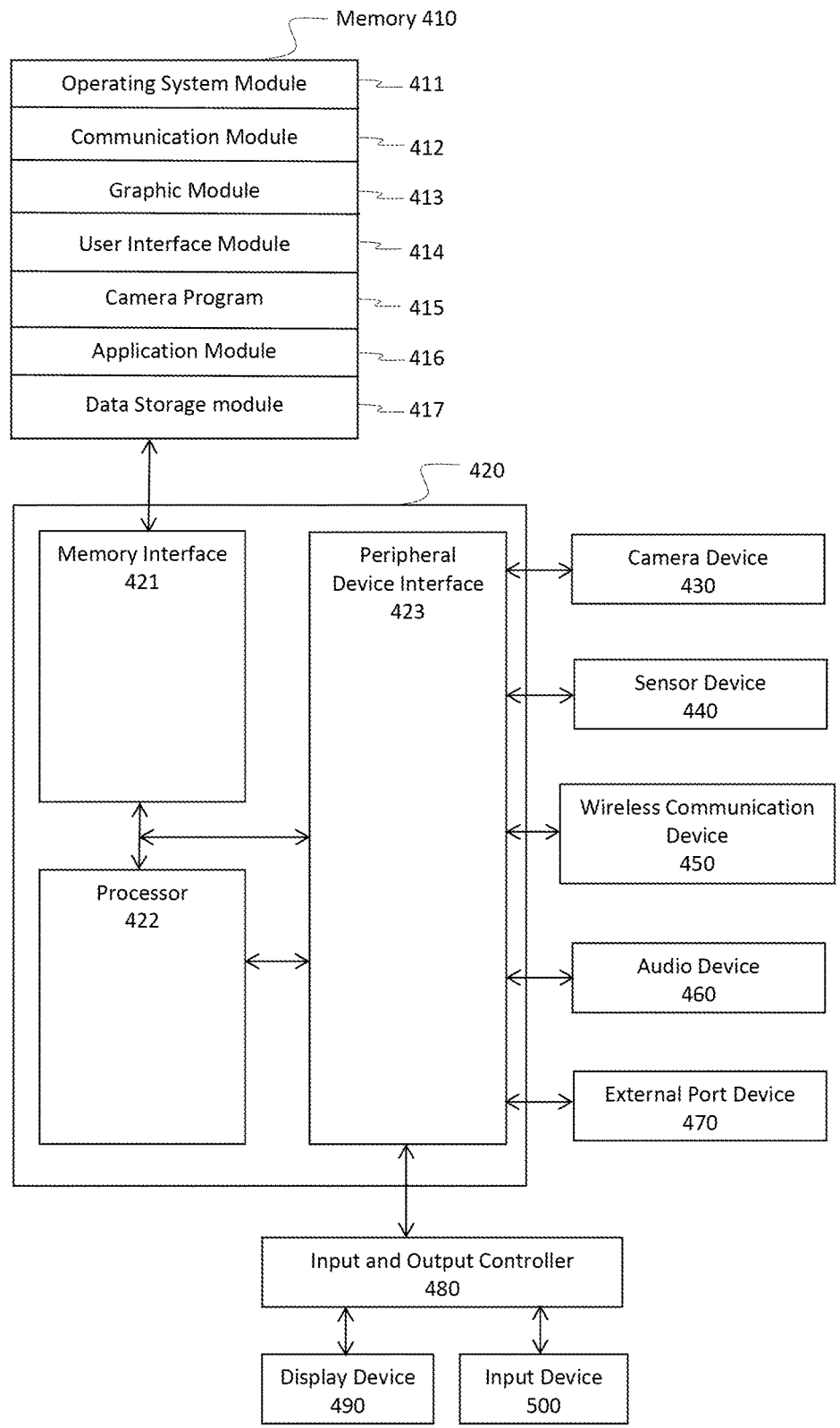
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, the electronic device 400 may be a device such as a PDA, a laptop computer, a mobile phone, a smart phone, a Netbook computer, a hand-held computer, an MID, a media player, a UMPC, a tablet PC, a notebook PC, a wrist watch, a navigation device, an MP3 player, a camera device, and a wearable device. Further, the electronic device 400 may be a random device including a device in which two or more functions of such devices are coupled. In correlation with the above drawings, the electronic device 400 may be used by the user 207 when implementing aspects of the present disclosure.

According to an embodiment, the electronic device 400 may include a memory 410, a processor unit 420, a camera device 430, a sensor device 440, a wireless communication device 450, an audio device 460, an external port device 470, an input and output controller 480, a display device 490, and an input device 500. The memory 410 and the external port device 470 may be formed in plural.

The processor unit 420 may include a memory interface 421, at least one processor 422, and a peripheral device interface 423. Here, the memory interface 421, the at least one processor 422, and the peripheral device interface 423 included in the processor unit 420 may be integrated into at least one integrated circuit or may be implemented with a separate constituent element.

The memory interface 421 may control access of a constituent element such as the processor 422 or the peripheral device interface 423 to the memory 410.

The peripheral device interface 423 may control a connection of the memory interface 421, the processor 422, and an input and output peripheral device of the electronic device 400.

The processor 422 may control the electronic device 400 to provide various services using at least one software program. By executing at least one program stored at the memory 410, the processor 422 may provide a service corresponding to the program.

By executing several software programs, the processor 422 may perform several functions for the electronic device 400 and perform a processing and control for audio dedicated communication, audiovisual communication, and data communication. Further, by interlocking with software modules stored at the memory 410, the processor 422 may perform a method according to various embodiments of the present disclosure. In more detail, the processor 422 may control to perform a search function as described above.

The processor 422 may include at least one data processor, image processor, or coder and decoder (codec). Further, the electronic device 400 may separately form a data processor, an image processor, or a codec.

Various constituent elements of the electronic device 400 may be connected through at least one communication bus (not shown) or an electrical connection means (not shown).

The camera device 430 may perform a camera function of a picture, a video clip, and a recording. The camera device 430 may include a Charged Coupled Device (CCD) or a Complementary Metal-Oxide Semiconductor (CMOS). Further, the camera device 430 may change a hardware configuration, for example, may adjust a lens movement and the number of apertures according to a camera program in which the processor 422 executes. Such camera device 430 may be implemented with a closed loop method that applies a feedback principle.

The sensor device 440 may include a proximity sensor, a hall sensor, an illumination sensor, a motion sensor, etc. For example, the proximity sensor may detect an object approaching the electronic device 400, and the hall sensor may detect a magnetic force of a metal body. Further, the illumination sensor may detect light of a periphery of the electronic device 400, and the motion sensor may include an acceleration sensor or a gyro sensor that detects a motion of the electronic device 400. However, the sensor device 440 is not limited thereto and may further include various sensors that perform known other additional functions.

The wireless communication device 450 enables performance of wireless communication and may include a radio frequency transmitter and receiver or a light (e.g., infrared rays) transmitter and receiver. Although not shown, the wireless communication device 450 may include a Radio Frequency Integrated Circuit unit (RF IC unit) and a base band processor. The RF IC unit may transmit and receive electromagnetic waves, convert a base band signal from the base band processor to electromagnetic waves, and transmit the electromagnetic waves through an antenna. The wireless communication device 450 may be controlled by the peripheral device interface 423 and/or the processor 422 to communicate with a connector, such as the connector 203 in FIG. 2, through an IP network.

The RF IC unit may include an RF transceiver, an amplifier, a tuner, an oscillator, a digital signal processor, a codec chip set, and a Subscriber Identity Module (SIM) card.

The wireless communication device 450 may operate through at least one of a Global System for Mobile Communication (GSM) network, an Enhanced Data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, an Near Field Communication (NFC) network, an Infrared ray communication network, and a Bluetooth network according to a communication network. However, the wireless communication device 450 is not limited thereto and may use several communication methods through a protocol for an e-mail, instant messaging, or a Short Message Service (SMS).

The audio device 460 may be connected to a speaker (not shown) and a microphone (not shown) to perform an audio input and output function such as a speech recognition, voice duplication, digital recording, or communication function. The audio device 460 may provide an audio interface between a user and the electronic device 400, convert a data signal received from the processor 422 to an electric signal, and output the converted electric signal through the speaker.

The speaker may convert and output an electric signal to an audible frequency band and be disposed at the front side or the rear side of the electronic device 400. The speaker may include a flexible film speaker in which at least one piezoelectric body is attached to a vibration film.

The microphone may convert a sound wave transferred from a person or other sound sources to an electric signal. The audio device 460 may receive an electric signal from the microphone, convert the received electric signal to an audio data signal, and transfer the converted audio data signal to the processor 422. The audio device 460 may include an earphone, an ear set, a headphone, or a head set that may be detachably provided in the electronic device 400.

The external port device 470 may directly connect the electronic device 400 to another electronic device or may be indirectly connected to another electronic device through a network (e.g., Internet, Intranet, or wireless Local area network (LAN)). The external port device 470 may include a Universal Serial Bus (USB) port or a FIREWIRE port.

The input and output controller 480 may provide an interface between the peripheral device interface 423 and an input and output device such as the display device 490 and the input device 500. The input and output controller 480 may include a display device controller and other input device controllers.

The display device 490 may provide an input and output interface between the electronic device 400 and a user. The display device 490 may transfer user touch information to the processor 422 using touch detection technology and show visual information, text, graphic, or video provided from the processor 422 to the user.

The display device 490 may display state information of the electronic device 400, a moving picture, a still picture, and a character in which the user inputs. Further, the display device 490 may display application related information driven by the processor 422. Such a display device 490 may use at least one of a Liquid Crystal Display (LCD), an Organic Light Emitting Diode (OLED), an Active Mode Organic Light Emitting Diode (AMOLED), a Thin Film Transistor-Liquid Crystal Display (TFT-LCD), a flexible display, and a three-dimensional (3D) display.

The input device 500 may provide input data generated by a user selection to the processor 422 through the input and output controller 480. The input device 500 may include a keypad including at least one hardware button and a touch pad that detects touch information.

The input device 500 may include an up/down button for a volume control and may further include at least one of pointer devices such as a push button, a locker button, a locker switch, a thumb-wheel, a dial, a stick, a mouse, a track-ball, or a stylus in which a corresponding function is given.

The memory 410 may include a non-volatile memory or a high speed Random Access Memory (RAM) such as at least one magnetic disk storage device, at least one light storage device, or a flash memory (e.g., NAND, NOR).

The memory 410 stores software, and such software may include an operating system module 411, a communication module 412, a graphic module 413, a user interface module 414, a camera program 415, an application module 416, and a data storage module 417. A term of a module may be represented with a set of instructions, an instruction set, or a program.

The operating system module 411 may include a built-in operation system such as WINDOWS, LINUX, Darwin, RTXC, UNIX, OS X, Android or VxWorks and include several software components that control a general system operation. A control of such a general system operation may include memory control and management, storage hardware (device) control and management, and power control and management. Further, the operating system module 411 may perform a function of enabling to smoothly perform communication between several hardware (device) and software components (module).

The communication module 412 may perform communication with another electronic device such as a computer, a server, and an electronic device through the wireless communication device 450 or the external port device 470.

The graphic module 413 may include several software components for providing and displaying graphic to the display device 490. The term graphic may indicate a text, a web page, an icon, a digital image, video, and animation.

The user interface module 414 may include several software components related to a user interface. The user interface module 414 may control the display device 490 to display application related information driven by the processor 422. Further, the user interface module 414 may include contents on a change of a user interface state or a condition in which a user interface state is changed.

The camera program 415 may include various software components for performing a camera function.

The application module 416 may include a software component of at least one application installed in the electronic device 400. Such an application may include a browser, an email, a phonebook, a game, an SMS, a Multimedia Message Service (MMS), a Social Network Service (SNS), an instant message, a wake-up call, an MP3 player, a scheduler, a drawing board, a camera, word processing, keyboard emulation, a music player, an address book, a contact list, a widget, Digital Rights Management (DRM), speech recognition, voice duplication, a location determination function, a location based service, and a user authentication service. The term application may be represented with an application program.

The data storage module 417 may provide a location at which data retrieved from a connector, such as the connector 203 of FIG. 3, through an IP network may be stored. In an embodiment, the data storage module 417 may provide a location at which search results based on a social distance are stored. Also, the data storage module 417 may provide a location at which data preferences for searching are stored. For example, the data storage module may store values of N that are set by the user, set during manufacture of the electronic device 400, changed by the user, and the like.

The processor unit 420 may further include an additional module (instructions) in addition to the foregoing module.

Various functions of the electronic device 400 may be executed by hardware or software including at least one processing or Application Specific Integrated Circuit (ASIC).

Although not shown, the electronic device 400 may include a power system that supplies power to several constituent elements included therein. The power system may include a power source (AC power source or battery), a power error detection circuit, a power converter, a power inverter, a charge device, or a power state display device (light emitting diode). Further, the electronic device 100 may include a power management and control device that performs a function of generating, managing, and distributing power.

In an exemplary embodiment, constituent elements of the electronic device 400 are illustrated, but the present disclosure is not limited thereto. For example, the electronic device 400 may have constituent elements of the number more than or fewer than those shown in the drawings.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for searching for contents, the method comprising:
   receiving a query to search content of a social networking service (SNS) database from a user;
   setting a value representing a social distance from the user to other users within the SNS database, the social distance including one or more levels;
   narrowing the content of the SNS database to content that is associated with one or more users including one or more contacts of the user that are within the set value of social distance from the user;
   performing a search, corresponding to the query, of the narrowed content of the SNS database;
   gathering results of the search; and
   providing the gathered results to the user.

2. The method of claim 1, further comprising resetting the value representing the social distance based on the gathered results.

3. The method of claim 1, wherein the results are gathered based on at least one of alphabetically, a last access time, an activity level, and a time of creation.

4. The method of claim 1, wherein the results are gathered from data containers within the SNS database.

5. At least one non-transitory processor readable medium for storing a computer program of instructions configured to be readable by at least one processor for instructing the at least one processor to execute a computer process for performing the method as recited in claim 1.

6. A system for searching for contents, the system comprising:
   a social networking service (SNS) database, the SNS database including content; and
   at least one processor configured to:
     receive a query to search content of the SNS database from a user,
     set a value representing a social distance from the user to other users within the SNS database, the social distance including one or more levels,
     narrow the content of the SNS database to content that is associated with one or more users including one or more contacts of the user that are within the set value of social distance from the user,
     perform a search, corresponding to the query, of content of the SNS database,
     gather results of the search, and
     provide the gathered results to the user.

7. The system of claim 6, wherein the at least one processor is further configured to reset the value representing the social distance based on the gathered results.

8. The system of claim 6, wherein the at least one processor is further configured to gather the results based on at least one of alphabetically, a last access time, an activity level, and a time of creation.

9. The system of claim 6, wherein the SNS database comprises data containers.

10. A user device for searching for contents, the user device comprising:
an input device configured to:
receive a query to search content of a social networking service (SNS) database from a user, and
receive a value representing a social distance from the user to other users within the SNS database, the social distance including one or more levels;
a wireless communication device configured to:
transmit the query and the value representing the social distance to a network, and
receive results corresponding to the query; and
a display device configured to provide the received results to the user,
wherein the results correspond to narrowed content of the SNS database that is associated with one or more users including one or more contacts of the user that are within the set value of social distance from the user.

11. The user device of claim 10, wherein the value representing the social distance is re-input by the user based on the received results and retransmitted by the wireless communication device.

12. The user device of claim 10, wherein the results are gathered based on at least one of alphabetically, a last access time, an activity level, and a time of creation.

13. The user device of claim 10, wherein the results are gathered from data containers within an SNS website.

* * * * *